Dec. 6, 1927.  
C. W. McKINLEY  
1,651,400  
FILTER  
Filed March 11, 1926  
4 Sheets-Sheet 1

Inventor  
Charles W. McKinley  
By Blackmore, Spencer & Flint  
Attorneys

Dec. 6, 1927.

C. W. McKINLEY 1,651,400

FILTER

Filed March 11, 1926

Inventor
Charles W. McKinley

By Blackmore, Spencer & Flint
Attorneys

Dec. 6, 1927.

C. W. McKINLEY 1,651,400

FILTER

Filed March 11, 1926     4 Sheets-Sheet 3

Inventor
Charles W. McKinley

By Blackmore, Spencer & Fluti
Attorneys

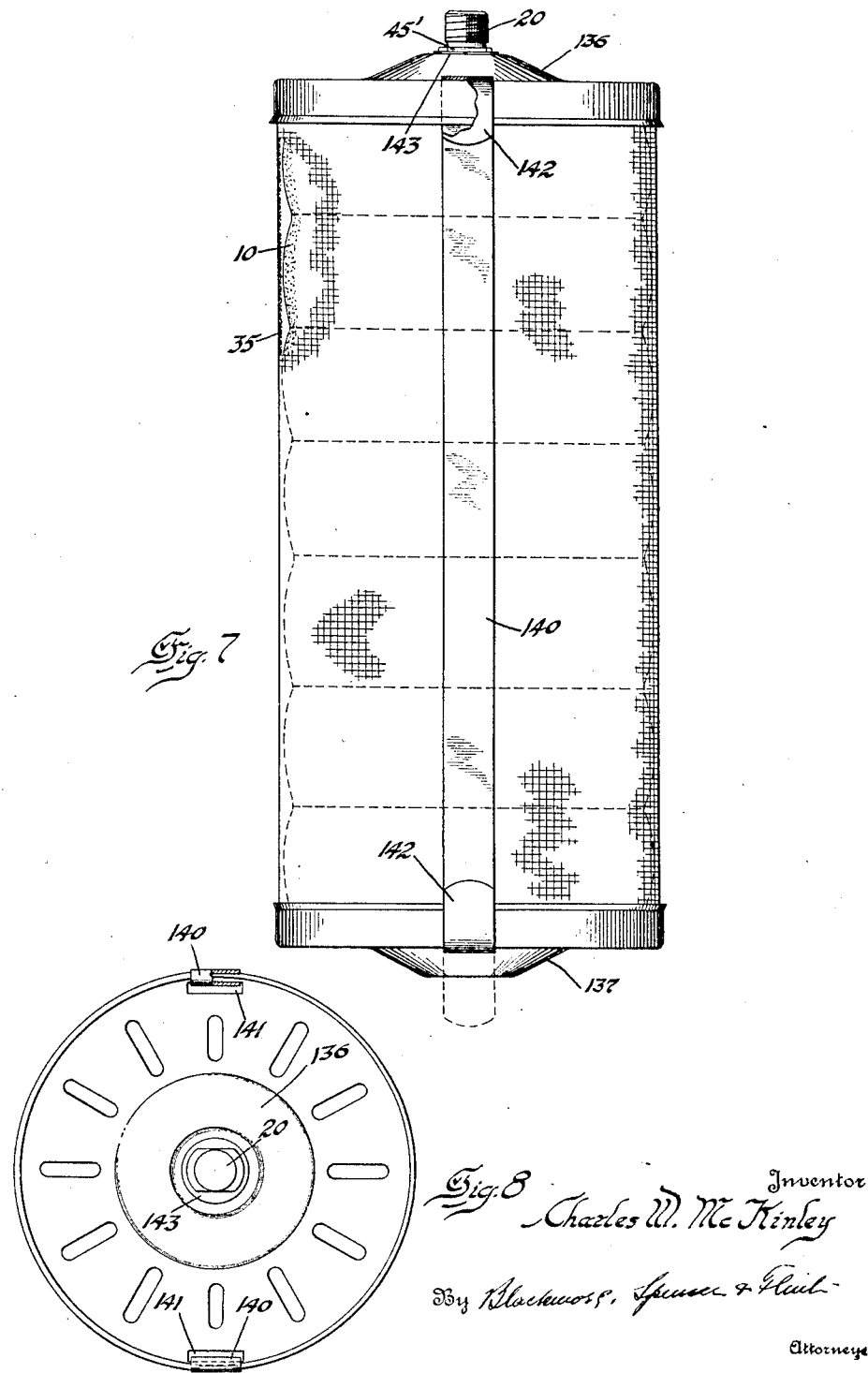

Patented Dec. 6, 1927.

1,651,400

UNITED STATES PATENT OFFICE.

CHARLES W. McKINLEY, OF FLINT, MICHIGAN, ASSIGNOR TO A C SPARK PLUG COMPANY, OF FLINT, MICHIGAN, A COMPANY OF MICHIGAN.

FILTER.

Application filed March 11, 1926. Serial No. 93,944.

The invention relates to devices for separating solids from fluids and, while obviously of more general application, has been especially designed for, and will be herein described as applied to, the removal of impurities from lubricants. In the operation of mechanism in which a body of oil is maintained in a storage space, as, for example in the crank case of an internal combustion engine, from which the oil is supplied to various parts to be lubricated, it is desirable to provide means whereby a portion, at least, of the circulating oil may be continuously passed through a filtering device. The oil may be thereby maintained in a relatively purer condition, its efficiency as a lubricant enhanced and removal or renewal of the body of oil rendered necessary much less frequently.

The invention contemplates, therefore, and has as one of its objects, the provision of a filtering device in which are combined the advantages of compactness, efficiency, long life, simplicity of construction, and cheapness. The device furthermore, because of its portability and ease of installation and repair, its capability of operation for long periods without attention, and its adaptability for production in large quantities at relatively low cost, is peculiarly fitted for use in connection with automobile power plants and in similar situations when like qualities are desired. More specifically, the invention aims to afford a great area of effective filtering medium within a small space and with the minimum of material as well as novel means for supporting and housing the filtering medium and to provide means for controlling the flow of material to the filter in accordance with the condition of the filtering medium.

Other objects and advantages will appear from the following description taken in connection with the accompanying drawings in which:

Fig. 7 is an elevation and Fig. 8 a plan view of a form of filter unit.

Figure 1:
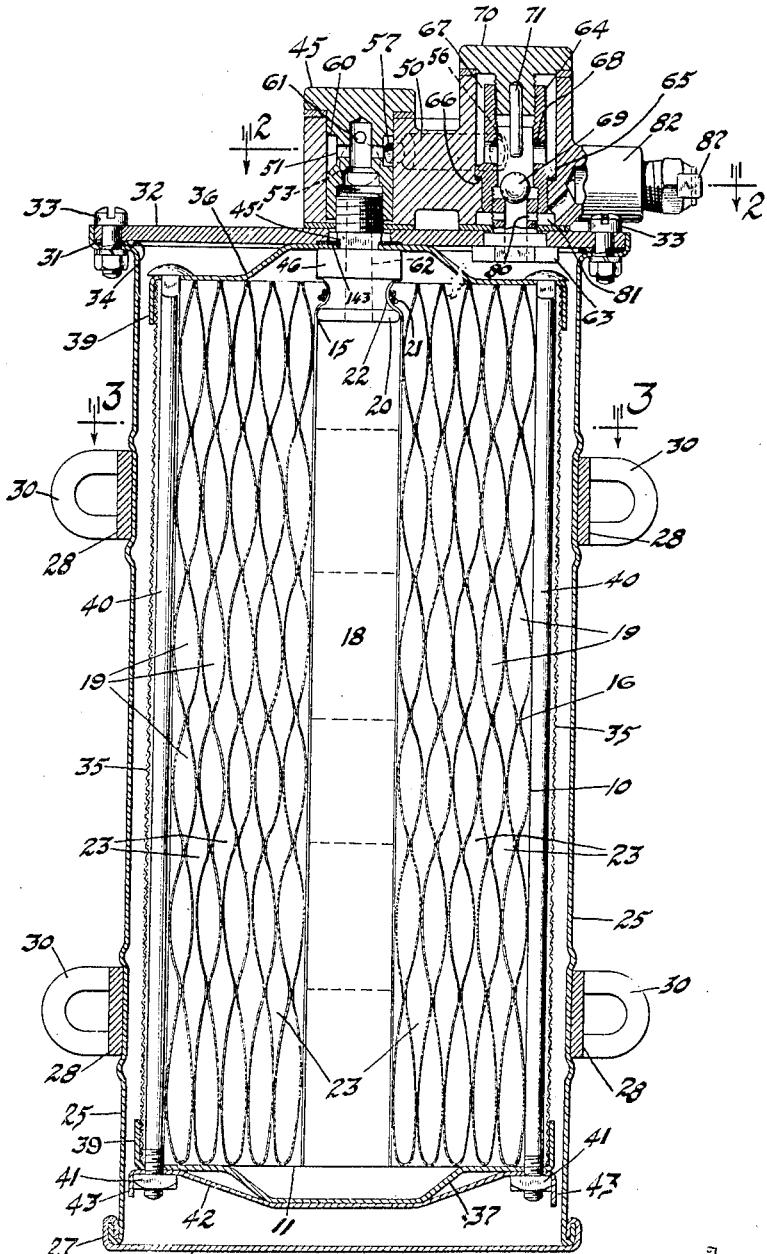
Fig. 1 represents a vertical section through one form of structure embodying the invention.
Figure 2:
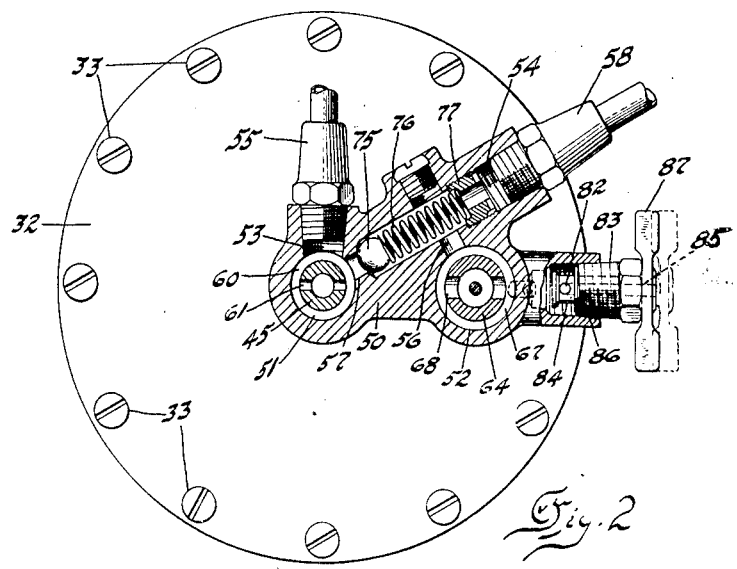
Fig. 2 is a plan view with parts in section on line 2—2 of Fig. 1.
Figure 3:
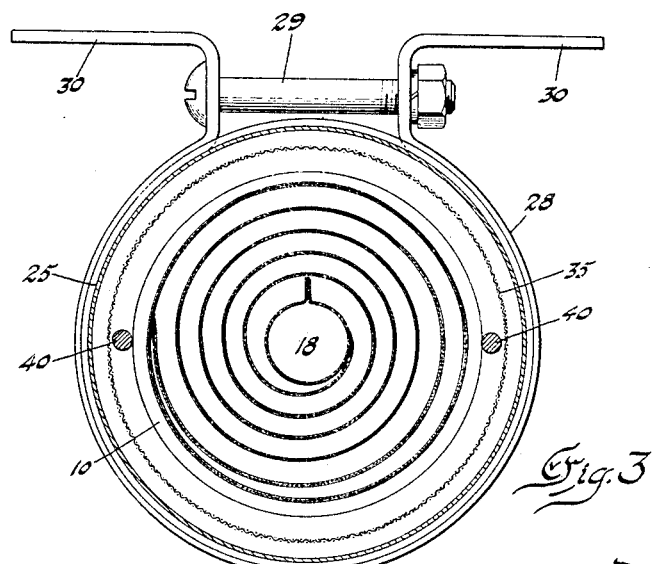
Fig. 3 is a section on line 3—3 of Fig. 1.
Figures 4, 5:
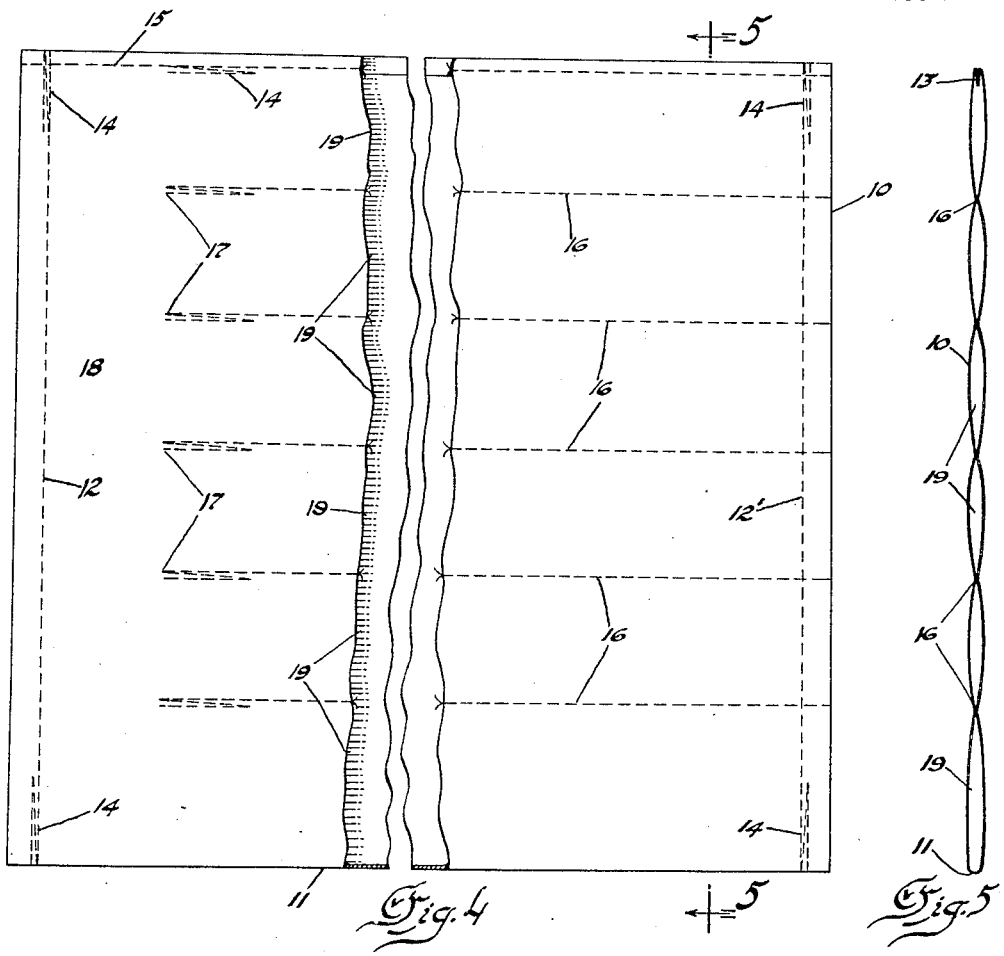
Fig. 4 is a view in elevation of a filtering element or bag.
Fig. 5 is a section on line 5—5 of Fig. 4.
Figure 6:
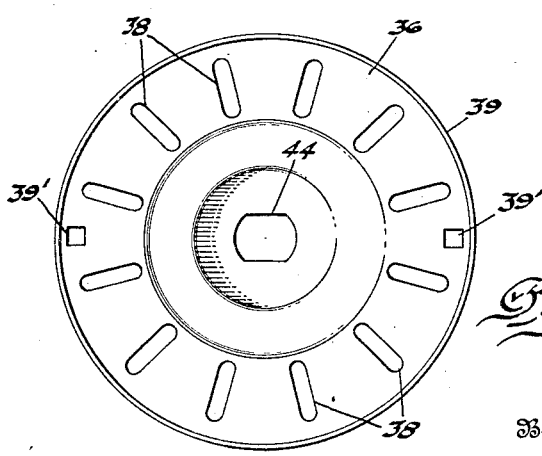
Fig. 6 is a plan view of a cover forming part of a cage or holder for the filtering medium.

In the embodiment of the invention shown in the drawings, I provide a filtering container 10 of pervious material, such, for example, as cloth of suitable strength and fineness of mesh. This container is therefore of bag-like character and will be hereinafter designated as a filter bag. This bag may be variously modified in details within the scope of the invention, but in the form illustrated, which is preferred because of its efficiency in operation and convenience of manufacture, it is constituted of a single sheet of fabric, folded upon itself as at 11, and stitched or sewed along the ends at 12, 12', and the edge at 13. The seams may be reinforced at their ends by additional stitching as at 14. An opening 15 is left at any convenient point along the periphery of the bag, preferably adjacent to one corner and at a position indicated in the drawing as the upper edge. This opening provides an entrance to the bag and may communicate with any suitable device for supplying to the interior of the bag the material to be filtered.

Intermediate of the edges, the walls of the bag are brought into juxtaposition in such manner as to provide a plurality of pockets or passages extending longitudinally of the bag. This may be conveniently accomplished by applying a row or rows of stitches, as at 16, securing the walls of the bag together through the major portion of the length of the bag. The securing means terminates, however, as indicated at 17, at points spaced from the seam 12. There is thus formed a conduit or header 18, extending from the opening 15 entirely across the bag, and a plurality of pockets or filtering passages 19, leading from the header 18 and terminating at the opposite end of the bag at the seam 12.

The bag thus constituted is then arranged in a series of superposed layers, as by rolling it into the form of a spiral, the header 18 and opening 15 being preferably at the center. The walls of the bag around the opening 15 are secured over the discharge end of a suitable supply fitting 20, (Fig. 1) as by a wire 21 clamping the mouth of the bag in a groove 22 in the fitting. The bag is preferably rolled rather tightly in the spiral, as it has been found that the length of service is thereby improved.

By reference to Fig. 1, it will be understood that when a bag, formed as above described, is arranged in superposed layers, as by folding or rolling in the direction of the passages 19, and fluid under pressure is supplied to the interior of the bag, the fluid will flow into the conduits or passages 19 and distend the walls of the same so that they assume, in cross-section, a somewhat elliptical or diamond shape. These superposed conduits will obviously contact with each other, and when distended will provide, between one series of conduits and the one next above or below, a passage 23 which will parallel the conduits 19 and will open at one end to the outside of the bag assembly. The material to be filtered which passes through the walls of the conduits 19 into the passages 23 finds free exit along these passages to the space surrounding the bag.

The filter bag assembly may be supported or suspended in any suitable receptacle into which the filtered material is to be delivered. Since the filter as herein disclosed is especially designed for use in filtering the lubricating oil of an automobile power plant I have illustrated the receptacle as of a form suitable for such use. It comprises, as shown, a cylindrical can having a side wall 25 and an end or bottom wall 26 which may be seamed together at 27 in the manner usual in making sheet metal ware. Straps 28 may be clamped about the can by bolts 29, the ends 30 of the straps extending outwardly to serve as attaching means whereby the can and associated parts may be mounted upon a dash or other available base.

The side wall of the can at the end opposite the wall 26, indicated in the drawing as the top or upper end, is flanged outwardly at 31 to provide a seat for cover plate 32. The cover plate is removable to permit the insertion or removal of the filter assembly and is secured to the can as by bolts 33, a gasket 34 being positioned between cover and can.

The cover 32 serves as a support for the filter assembly which is positioned within the can and comprises a cage 35 of perforated or foraminous material, as wire netting, within which the filter body or bag 10 is retained. The top and bottom of the cage are closed by end heads 36, 37, respectively, which may be identical and each of which is provided with a series of slots 38 to permit free exit of fluid from the cage. The end heads are flanged, as at 39, to fit over the ends of the cylindrical screen wall 35 and the parts are secured together by threaded rods or bolts 40 extending through square apertures 39' in the heads, the upper ends of the bolts being squared to fit the apertures in head 36. The nuts 41 on these rods may be locked by a metal strip 42, having holes through which the bolts extend and bent downwardly at its ends 43 to prevent the nuts from turning.

The head 36 has a central non-circular aperture 44 adapted to fit the similarly shaped neck 45' of inlet fitting 20. The neck is screwthreaded above the non-circular portion and extends through a central aperture in the cover plate. The sleeve nut 45, engaging the screwthreaded portion of the fitting serves to clamp the head 36 between the cover 32 and the shoulder 46 on the fitting. The filter assembly is thus secured rigidly to the cover 32 and may be inserted into the can or removed therefrom as a whole.

The cover 32 also serves as a support for the devices whereby supply of liquid to the filter and delivery therefrom are controlled. These comprise a body 50 having vertical inlet and outlet passages 51, 52, and horizontal passages, 53, 54. The passage 53 communicates with inlet passage 51 and is threaded to receive a pipe connection 55 leading from a pump or other suitable source of material to be filtered. Passage 54 communicates through channel 56 with outlet passage 52, for normal delivery from the filter, and, through valve controlled channel 57, with passage 51 for by-passing the filter under certain conditions. The passage 54 is also screwthreaded to receive pipe connection 58 leading to the delivery point for the oil or other material being filtered.

The sleeve nut 45, which fits closely the passage 51, is formed with an annular groove 60 communicating through radial holes 61 with the hollow interior of the nut, which is connected, in turn, to the interior of the filter container 10 by the bore 62 of inlet fitting 20. Material to be filtered is therefore introduced normally through pipe connection 55, passage 53, channel 60, holes 61, and the internal bores of nut 45 and fitting 20 to the filter body or bag.

Discharge from the interior of the filter receptacle or can occurs normally through the tubular outlet fitting 63 which extends through a hole in the cover plate 32 near the periphery thereof. This fitting has a wrench head on the lower end engaging the under side of the cover plate, and the upper end is exteriorly threaded. A sleeve 64 interiorly threaded at both ends, engages at its lower end with the threads on fitting 63. The sleeve is also provided with an exterior shoulder 65 seating on the annular ledge 66 in the passage 52. By rotating the fitting 63, the fitting and sleeve may be secured together and to the cover and at the same time the body 50 is clamped to the cover. The sleeve nut 45, by engagement of its head with the upper side of body 50, also serves to clamp the body to the cover. The body 50 and its associated parts are therefore rigidly mounted upon the cover as a single assembly.

An annular space 67 is provided between sleeve 64 and the walls of passage 52 which communicates with the interior of the sleeve through holes 68 in the walls of the sleeve. The upper end of fitting 63 is formed as a valve seat for a ball check valve 69. Filtered material flowing from the filter will therefore pass normally through fitting 63, past valve 69 through holes 68 and space 67 to passage 56 and thence to the delivery pipe. The upper end of passage 52 will, of course, be closed in any suitable manner, as by cap nut 70 engaging the upper threads of sleeve 64. This nut may carry a pin 71 to restrict the movement of valve 69.

The opening 57, leading from annular channel 60 to passage 54, is formed with a valve seat to receive the ball valve 75 opening toward the passage 54 and held to its seat by a spring 76. The spring may be adjusted by a sleeve 77 engaging screw threads on the inner surface of passage 54. The pressure exerted on the valve by the spring will be sufficient to prevent the opening of the valve under the normal pressure required for the circulation of the liquid. However, should the filter body become clogged, or for any other reason the flow through the filter be hindered so as to cause a rise of pressure on the inlet side to a point predetermined by the adjustment of spring 76, then flow through the by-pass is permitted.

It is highly desirable to provide means for ascertaining readily the conditions of flow through the filter so that, if clogging or derangement has occurred, suitable repair or replacement may be made. To effect this result I have provided an outlet from the discharge passage through fitting 63 comprising holes 80 extending radially through the walls of the fitting through which communication is afforded between the bore of the fittting and an annular space 81 at the lower end of passage 52. The space 81 communicates with the interior of a hollow boss 82 the outer end of which is closed by a valve casing 83 in screwthreaded engagement with the internal walls of the boss. The interior of the sleeve is also screwthreaded to engage with the valve plug 84. This plug is provided with a central bore 85 the inner end of which opens to the periphery of the plug through radial holes 86. A handle 87 is secured to the valve plug to facilitate manual operation. By rotation of this plug to the position shown in full lines in the drawing the opening 86 is placed in communication with the space 81 and a portion of the liquid flowing through the bore of fittting 63 is permitted to escape through holes 80, space 81, hole 86 and bore 85 to the outside, thus indicating that liquid is being forced through the filter. If, however, the bypass valve 75 is open and no liquid is passing through the filter, the check valve 69 will be in engagement with its seat and no flow will take place from the test cock. Upon completion of the test the valve plug may be rotated in a direction to move it outwardly, as to the dotted line position of the handle shown in the drawing. The hole 86 may be thus brought out of registry with the space inward of the valve sleeve 83 and the head of the valve plug, which is, as shown, slightly enlarged, may be firmly seated against the inner end of the valve sleeve. Any leakage, or the unintentional removal of the valve plug, is thus prevented.

In Figs. 7 and 8 I have shown a form of filter unit which presents especial advantages in the way of compactness and ease of manufacture and assembly, either for original installation or for replacement. This unit comprises the end heads 136, 137, which are or may be identical and are similar in general to the end heads 36, 37, previously described. The cylindrical screen member 35 has its ends positioned within the end heads and serves to confine the filter bag 10 and to space the heads apart. In order to hold the heads and screen in assembled relation I provide two or more metal straps 140, extending longitudinally of the screen 35. The upper and lower ends of these straps are passed through slots 141 in the heads 136 and 137 respectively and are bent over on the outside to form tongues 142.

The filter bag when rolled up spirally forms a cylindrical roll which is preferably of such dimensions as to fit neatly within the screen 35 and to extend slightly beyond the ends thereof. Hence the roll must be somewhat compressed endwise in order to assemble the end heads upon the screen. The bag itself, therefore, exerts some pressure tending to spread the ends apart. The bag is connected at its center to the inlet fitting 20 which extends through the central aperture of the head 136 as in the construction previously described. A split washer 143 is positioned in a groove in the neck 45' of fitting 20 and serves to prevent inward movement of the fitting 20.

The assembly comprising the cage with the bag therein constitutes a self-contained unit particularly adapted for manufacture and sale as such and capable of being installed in a can or in any position of use without special skill or tools. The provision of this unit enables an old filter bag to be replaced by a new one with very little expense or trouble. The other parts of the filter are not liable to derangement or injury, but, owing to the extremely simple manner of assembly, may be readily replaced if desired.

When used in connection with the lubricating system of an internal combustion engine, as, for example, on an automobile, the filter may be interposed in one of the conduits leading from the oil pump so that the oil flowing to one bearing or set of bearings, or if desired, all of the oil from the pump, will be supplied to the filter inlet. The bypass valve will be adjusted to open at a pressure above that normally required to force the oil through the filter and below the maximum at which the pump is capable of delivering oil. Should the filter, therefore, for any reason afford to the flow of oil a resistance greater than that for which the bypass valve provides, the latter at once opens thus preventing the interruption of supply to the lubricated devices.

Various changes in details may be made without departing from the spirit and scope of the invention and therefore I do not wish to be limited to the specific structure herein disclosed except as required by the language of the appended claims in view of the prior art.

I claim:

1. A filtering device comprising a pervious bag having its walls joined intermediate of the edges to provide a plurality of conduits leading from the mouth of the bag and closed at the ends remote from the mouth.

2. Structure as in claim 1, the bag having portions thereof superposed to reduce the space required for its reception.

3. Structure as in claim 1, the bag being rolled spirally with the mouth at the center of the roll in such manner that the conduits constitute spiral passages.

4. A filtering device comprising a pervious bag-like container having a plurality of interior conduits for material to be filtered, said container superposed upon itself and the conduits being so shaped that one or more exterior conduits for escape of filtered material are formed between the superposed walls.

5. Structure as in claim 4, the container being rolled so that the interior and exterior conduits have the form of spirals.

6. A filtering device comprising a bag having its walls joined to form a plurality of passages leading from the mouth of the bag, the bag being rolled so that the passages constitute spiral conduits, the conduits, when distended by pressure of fluid within the bag, forming therebetween spiral passages on the exterior of the bag for escape of filtered fluid.

7. A filtering device comprising pervious bag-like filtering means arranged in superposed layers, the walls of said means having alternate raised and depressed portions, the raised portions of superposed walls being in contact and the depressed portions providing drainage passages between the superposed walls.

8. A filtering device comprising a fabric bag having its walls secured together at intervals intermediate of its edges.

9. A filtering device as set forth in claim 8, the bag being rolled into spiral form, and having an inlet at one edge at the center of the spiral.

10. A filtering device comprising a substantially flat fabric bag having its walls secured together at intervals intermediate of its edges and having an inlet opening adjacent to one corner, said bag being rolled into spiral form with the inlet opening at the center of the spiral, means secured to said bag at the inlet opening for supplying liquid thereto, and a holder for said bag.

11. A filtering unit comprising a spirally wound bag, an inlet fitting communicating with the interior of the bag through an opening adjacent the center of the spiral, and a holder having end heads and perforated side walls suitably secured together and in which said bag is positioned, said fitting extending outwardly through one of said heads.

12. Structure as set forth in claim 11, said holder comprising end caps and a wire screen side wall member fitting within said end caps.

In testimony whereof I affix my signature.

CHARLES W. McKINLEY.